United States Patent
Marappa Gounder

(10) Patent No.: US 10,708,312 B2
(45) Date of Patent: Jul. 7, 2020

(54) THIRD PARTY IMS SERVICES

(71) Applicant: T-Mobile USA, Inc., Bellevue, WA (US)

(72) Inventor: Kulandaivel Marappa Gounder, Bothell, WA (US)

(73) Assignee: T-Mobile USA, Inc., Bellevue, WA (US)

(*) Notice: Subject to any disclaimer, the term of this patent is extended or adjusted under 35 U.S.C. 154(b) by 46 days.

(21) Appl. No.: 15/479,778

(22) Filed: Apr. 5, 2017

(65) Prior Publication Data

US 2018/0295157 A1 Oct. 11, 2018

(51) Int. Cl.
*H04L 29/06* (2006.01)
*H04W 8/18* (2009.01)

(52) U.S. Cl.
CPC ...... *H04L 65/1016* (2013.01); *H04L 65/1033* (2013.01); *H04L 65/1046* (2013.01); *H04L 65/1063* (2013.01); *H04W 8/18* (2013.01)

(58) Field of Classification Search
CPC .... H04L 65/1016; H04L 67/306; H04W 8/04; H04W 8/18
See application file for complete search history.

(56) References Cited

U.S. PATENT DOCUMENTS

| | | | | |
|---|---|---|---|---|
| 8,316,457 B1* | 11/2012 | Paczkowski | .......... | H04L 67/306 726/27 |
| 2007/0206620 A1* | 9/2007 | Cortes | .............. | H04L 29/06027 370/412 |
| 2011/0029558 A1 | 2/2011 | Chua | | |
| 2013/0054740 A1 | 2/2013 | Klein et al. | | |
| 2013/0081123 A1* | 3/2013 | Przybysz | .............. | H04L 63/062 726/7 |
| 2013/0229948 A1* | 9/2013 | Stewart | ............ | H04M 3/42246 370/259 |
| 2014/0301273 A1* | 10/2014 | Rameil-Green | .... | H04L 67/1002 370/328 |
| 2014/0341085 A1 | 11/2014 | Suryavanshi et al. | | |
| 2015/0095499 A1* | 4/2015 | Noldus | ............... | H04L 61/1511 709/226 |
| 2015/0358853 A1 | 12/2015 | Kiss | | |
| 2017/0041353 A1* | 2/2017 | Silver | .................... | H04W 76/10 |
| 2017/0257886 A1* | 9/2017 | Adjakple | .............. | H04W 12/08 |

OTHER PUBLICATIONS

PCT Search Report and Written Opinion dated Jul. 4, 2018 for PCT Application No. PCT/US18/24095, 14 pages.

\* cited by examiner

*Primary Examiner* — Shukri Taha
(74) *Attorney, Agent, or Firm* — Lee & Hayes, P.C.

(57) ABSTRACT

A telecommunications service provider provides a telecommunications infrastructure that is based in part on an IP Multimedia Subsystem (IMS). The provider may have various IMS application servers to support different services for subscribers of the provider, such as messaging, voice communications, presence, etc. In addition, third parties may provide their own IMS application servers for the same services or for different services. Subscribers of the provider are routed to the provider-supported application servers, while subscribers of the third parties are routed to application servers of the third parties. This allows third parties to implement and control their own services, while also leveraging the existing infrastructure of the provider.

20 Claims, 2 Drawing Sheets

THIRD PARTY IMS SERVICES

BACKGROUND

Modern cellular communication networks often include IP Multimedia Subsystems (IMSs) for delivering IP multimedia services. Various services are provided using different IMS application servers. Services can relate to many different types of communications, such as texting/messaging, conferencing, voice, video, and so forth. When a request is received from a subscribed device of a services provider, the request is routed to an application server corresponding to the type of service specified by the request.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
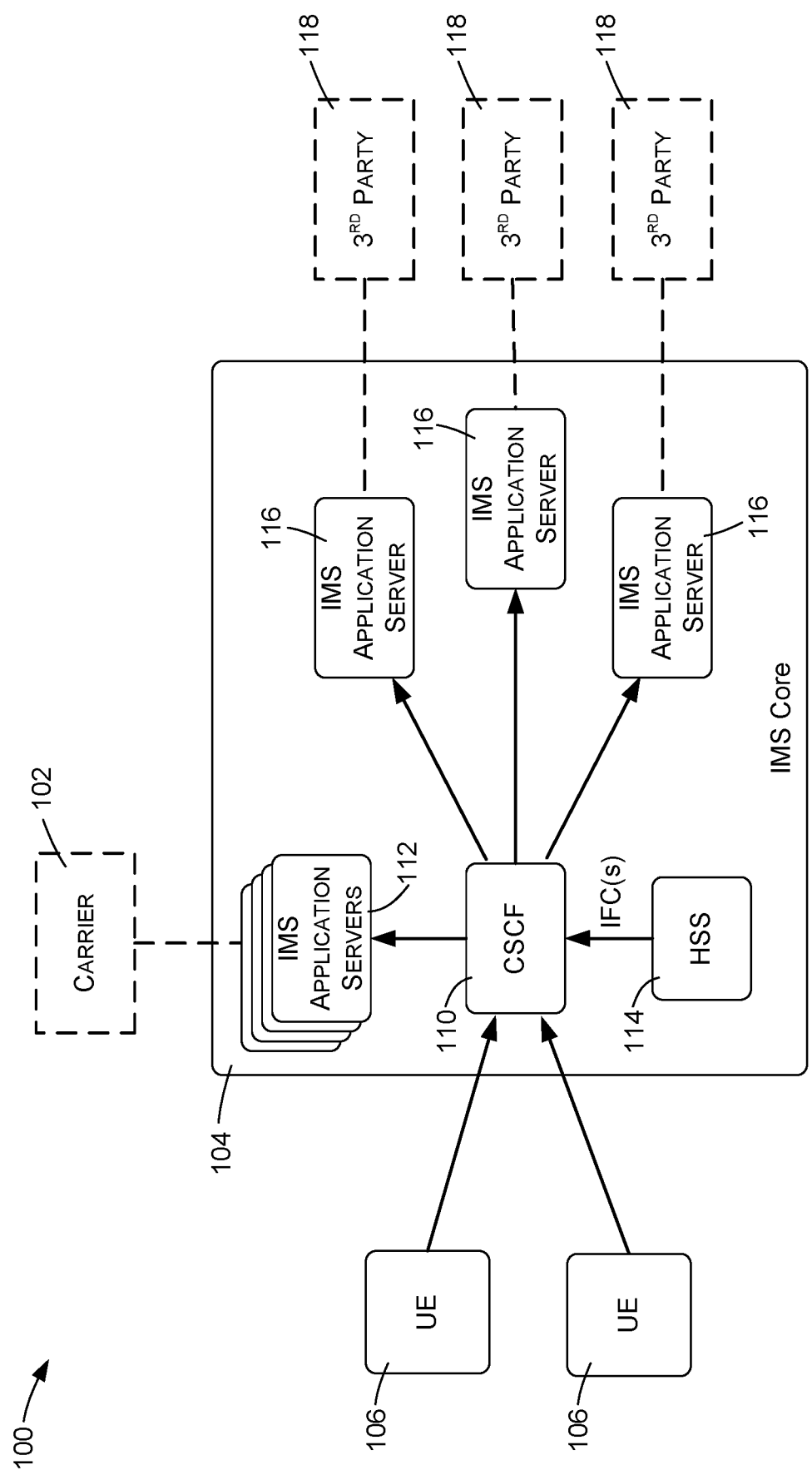
FIG. 1 is a block diagram illustrating a communication system that includes an IMS core, multiple carrier-supported application servers, and multiple third-party-supported application servers.

Described herein are systems and techniques that allow providers and other entities to offer their own dedicated wireless services, while using and operating within the infrastructure of an existing wireless communications carrier. That is, a business entity other than the carrier may also offer and provide its own wireless services, apart from the services offered by the carrier itself, while still using much of the carrier's infrastructure.

The infrastructure of a wireless communications carrier may include what is known as an IP Multimedia Subsystem (IMS). For example, IMS may be used within 3rd Generation Partnership Project (3GPP) Long-Term Evolution (LTE) wireless communication networks.

In certain embodiments described herein, a business entity other than the carrier (referred to herein as a third party) provides or controls a third-party IMS application server, which can be accessed by subscribers of the third party through the larger infrastructure of the carrier. The third-party application server may be configured to provide any type of service that the third party wants to offer to its subscribers, including voice services, video services, instant messaging (IM) services, etc., as well as new or different services that are defined by the third party itself. In the case of well-known and existing services such as IM and conferencing, any such service provided by the application server can be customized to the needs or specifications of the third party and/or its subscribers. For example, Quality-of-Service (QoS) parameters and billing details can be specified and controlled by the third party.

The third-party application server functions as part of an IMS Core, which in turn is part of an Evolved Packet Core (EPC) of the wireless communication carrier. The carrier has subscribers that use various IMS services provided by the carrier. Apart from the carrier's subscribers, the third party also has subscribers. The subscribers of the third party use the IMS services that have been provided by or on behalf of third party.

In operation, a user equipment (UE) may be a subscriber of either the carrier or the third-party. In either case, the UE communicates through wireless base stations of the carrier with an IMS Core of the carrier. An initial request from a UE is received by an IMS Call Session Control Function (CSCF). The request specifies a particular type of service, such as IM, multi-party gaming, video conferencing, etc. The CSCF uses subscriber information associated with the UE to determine which of multiple available application servers should receive the request. The subscriber information is set up so that requests from subscribers of the carrier are routed to IMS application servers of the carrier, and requests from subscribers of the third party are forwarded to application servers operated by or on behalf of the third party.

The described techniques can be useful in various situations. As one example, members of the emergency services community have noted the need for a dedicated network to be used by emergency service personnel. Such a network would be associated with particular service level agreements regarding reliability, speed, security, availability, etc. As another example, a third party may want to provide specialized video conferencing capabilities for its employees. As yet another example, a third party may be what is referred to as a "mobile virtual network operator" or MVNO, and may want to offer general voice, text, and data services under its own brand, using its own QoS parameters and billing schemes.

In each of these scenarios, the third party can provide a dedicated application server for providing the desired services. The application server can be configured to provide services using communication protocols that are consistent or compatible with IMS, and can be set up to function as an IMS application server within the larger IMS/EPC infrastructure of the carrier.

The application server may be located in a service center or other facility of the carrier, or may be located remotely, such as on premises of the third party, and may communicate using any of various forms of broadband network communications. Similarly, the application server can be provided and maintained by the third party or by the carrier on behalf of the third party in accordance with specifications provided by the third party.

These techniques allow the effective creation of dedicated wireless communication networks, without requiring a large infrastructure investment. Rather than implementing an entire EPC or IMS system, for example, a third-party services provider can instead provide an application server and plug it into the existing infrastructure of an existing wireless communications provider. The third party can then implement its own features, and in addition implement its own QoS parameters and billing practices.

FIG. 1 illustrates an example wireless telecommunication system 100, which may be provided and/or supported by a wireless communications carrier 102 or other service provider. The system 100 includes an Internet Protocol (IP) Multimedia Subsystem (IMS) core 104 that provides services for multiple user equipment (UE) devices 106.

Each UE 106 comprises a communication device configured to communicate over a wireless and/or wireline network, including, without limitation, a mobile phone (e.g., a smart phone), a tablet computer, a laptop computer, a portable digital assistant (PDA), a wearable computer, a television, a desktop computer, a game console, a set top box, a home automation component, a security system component, and so forth. In this sense, the terms "communication device," "wireless device," "wireline device," "mobile device," "computing device," and "user equipment (UE)" may be used interchangeably herein to describe any communication device capable of performing the techniques described herein.

In addition to the examples above, communication devices may comprise various types of devices that are embedded in various types of objects and equipment, such as in home automation equipment, automobiles, electronic book reading devices, computing devices, etc., and including various other things or objects that can send and receive data using either wired or wireless networks.

In the described embodiment, the UE 106 communicates with the IMS core 104 using an access network (not shown), which may comprise a cellular communication network or other type of wired or wireless network. The IMS core 104 is part of a larger infrastructure supported by the carrier 102. In the described embodiment, the IMS core 104 operates within an EPC of a Long-Term Evolution (LTE) network. Note that only the most relevant components of the IMS Core 104 are shown in FIG. 1.

IMS supports multiple services, which are provided by respective application servers. IMS defines three types of applications servers: SIP application servers, open services architecture (OSA) application servers, and Customized Applications for Mobile Networks using Enhanced Logic (CAMEL) application servers.

The IMS core 104 has one or more call session control functions (CSCFs) 110 that receive and process requests from the UEs 106 and that perform call session control. The CSCFs 110 may include a serving CSCF (S-CSCF), an interrogating CSCF (I-CSCF), and a proxy CSCF (P-CSCF), which work together to receive and respond to call requests, to communicate with application servers, and to implement other functionality as defined by IMS protocols and standards. Among other functions, a CSCF acts as a service broker to route service requests to appropriate application servers.

The IMS core 104 may have a Home Subscriber Server (HSS) 114, which is a database that stores a service profile for each subscriber. Among other things, a service profile specifies one or more Initial Filter Criteria (IFCs). Each IFC specifies a rule for handling requests received from the subscriber. Multiple rules for each user can be used to indicate, for each request from a particular subscribed device, an application server to which each request should be forwarded. For example, a particular rule may indicate the IP address of an application server that should receive requests for a particular service such as IMS or conferencing.

The IMS Core 104 may have multiple IMS application servers 112, referred to herein as carrier application servers, that are associated with the wireless communications carrier 102 and that provide various types of communication and media services. The carrier application servers 112 are provided, maintained, and used by the carrier 102 for providing services to its subscribers. For example, the carrier application servers 112 may include a telephony access server that provides voice communication services. The carrier application servers 112 may also include an IP short message gateway (IP-SM-GW), which is a service for communicating short messages, such as short message service (SMS) over IP (SMSIP) messages, between UEs. The carrier application servers 112 may include a Rich Communication Suite (RCS). RCS is a platform that supports various types of media communications, including one-to-one chat, group chat, file transfer, content sharing, voice calling, video calling, social presence, video calling, geolocation exchange, service identification, notifications, and others.

The system 100 may also have one or more third-party application servers 116 that are associated with business entities other than the wireless communications carrier 102. In particular, each of these servers 116 is an IMS application server provided by or on behalf of a corresponding third party 118 and that is implemented, supported, and/or managed by the third party 118 apart from the application servers 112 that have been implemented, supported, and/or managed by the carrier 102.

The third parties 118 may be referred to as entities or third-party entities in the following discussion. A third-party business entity is generally a business entity that offers some sort of telecommunication services to its subscribers.

A third party 118 can design and/or configure an IMS application server 116 to provide a customized service that the corresponding third party 118 wants to provide to its subscribed UEs. In some cases, a third-party application server 116 may provide a service of the same type as provided by one of the carrier application servers 112, albeit in some cases with different service parameters. In other situations, a third-party application server may provide a unique service that is particular to the business or subscribers of a third party.

A third-party application server 116 may be specified by a third party 118 for implementation by one or more computers of the carrier 102, such as by computers of a data center of the carrier 102. Alternatively, a third-party application server 116 may be implemented apart from the carrier 102, such as by computers of the third party or other network-based computers that communicate with the IMS core over broadband communication channels. In either case, the third-party application server 116 interacts with other components of the IMS core in the same manner as one of the carrier application servers 112.

The third parties 118 may exercise different levels of control over their application servers 116. For example, a third party 118 may in some cases be completely responsible for the running and maintenance of its application server 116. In other cases, the carrier 102 may manage the IMS application server 116, or portions of the management, on behalf of the associated third party 118.

To establish a communication session, a requesting one of the UEs 106 sends an initial request to the CSCF 110 of the IMS core 104. The CSCF 110 queries the HSS 114 to obtain one or more IFCs that are associated with the requesting UE 106. The CSCF 110 evaluates the IFCs to determine one of the application servers 112 or 116 to which the request should be routed, and forwards the request to that application server.

Each of the UEs 106 is a subscriber of either the carrier 102 or one of the third parties 108, and this information may be reflected by the IFCs, which work to route UE requests to different application servers. In cases where a third-party application server 116 provides the same service as one of the carrier application servers 112, such as conferencing services, for example, a request that specifies that service is routed to the corresponding application server of the business entity (carrier or third party) to which the requesting UE 106 is subscribed. For example, a request for conferencing services from a UE subscribed to the carrier 102 will be routed to a conferencing application server 112 that is associated with the carrier 102. A request for conferencing services from a UE that is subscribed to one of the third parties 118 will be routed to a conferencing application server 116 that is associated with that third party 118.

Although each of the third parties 118 is shown as having a single IMS application server 116, in practice each of multiple third parties may have or be associated with multiple application servers 116. When a business entity such as the carrier 102 or one of the third parties 108 has more than one application server, each of the application servers of that business entity may be configured to provide a respective service, such as IM, video, conferencing, etc. When an initial request from a particular UE 106 specifies a particular service, the request is routed or forwarded to an application server that is both (a) associated with the party to which the UE is subscribed and (b) configured to provide the particular service. In some cases, a particular UE 106 may be subscribed to certain services provided by the carrier 102 and to other services provided by one or more of the third parties 108.

Examples of services that may be provided by the carrier application servers 112 and/or the third-party application servers 116 include, without limitation:
  instant messaging;
  voice;
  video;
  audio;
  presence;
  streaming;
  charging;
  conferencing;
  location;
  business entity;
  push-to-talk voice;
  RCS; and
  earthquake and tsunami warning.

Figure 2:
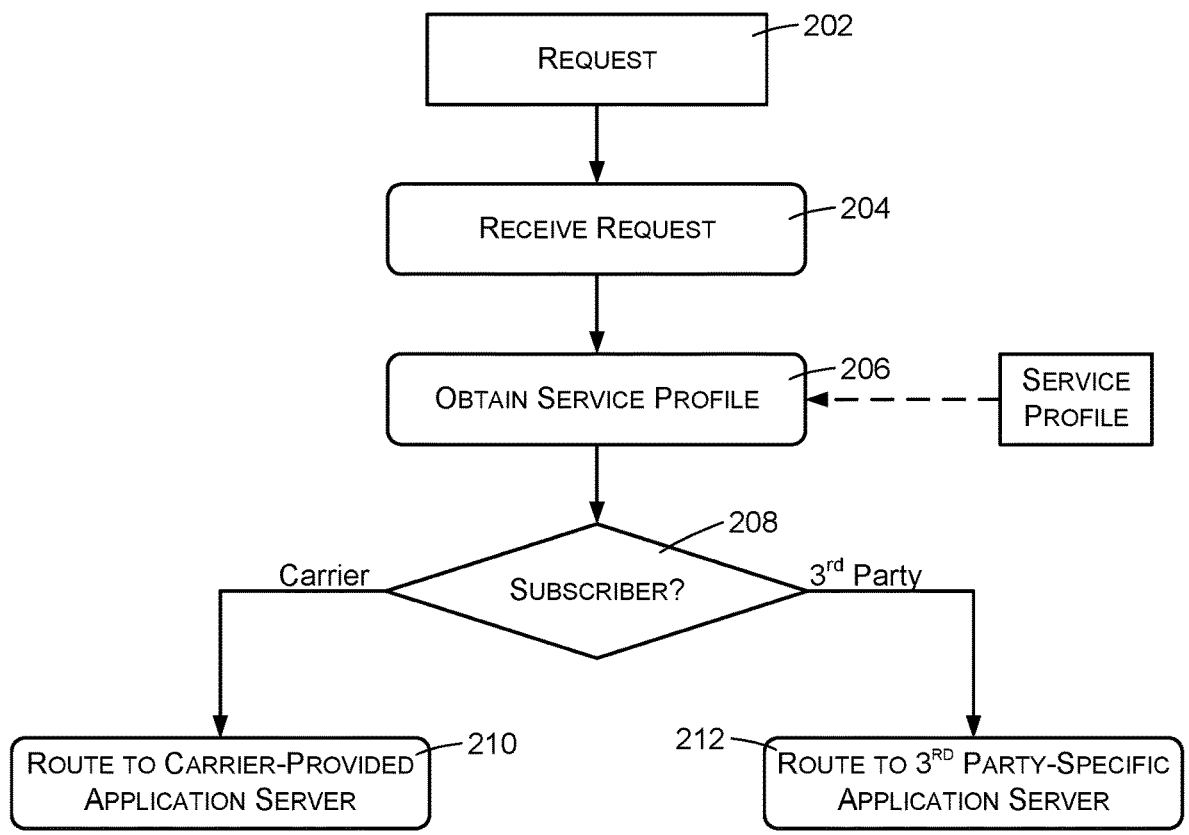
FIG. 2 is a flow diagram illustrating an example method of providing services using carrier-supported application servers and third-party-supported application servers.

FIG. 2 illustrates an example method 200 of processing an IMS service request or other service-related communication from a communication device. In certain embodiments, the method 200 is performed by one or more computing devices or other components that are associated with or are part of an IMS core, such as by one or more CSCFs of an IMS core. The IMS core is implemented, maintained, and supported by a wireless communications carrier or other service provider, such as a cellular communications carrier.

An action 204 comprises receiving, at a computing device associated with the IMS of a communications carrier or other service provider, a request 202 or other communication from a communication device. The request may specify a particular type of service to which the communication corresponds, such as voice, conferencing, video, messaging, etc. The request may be received from any of multiple communication devices, some of which may be subscribers of the wireless communications carrier and some of which may be subscribers of entities other than the wireless communications carrier, such as the third parties 118 of FIG. 1.

An action 206 comprises obtaining a service profile from an HSS of the wireless communications carrier to determine whether to route the request to an IMS application server of the wireless communications carrier or to an IMS application server of another business entity. As explained above, the service profile may have multiple IFCs that specify application servers for respective services. For subscribers of the wireless communications provider, the IFCs specify that requests for a particular service are to be routed to a carrier-provided IMS application server. For subscribers of other entities, the IFCs may specify that requests for a particular service are to be routed to IMS application servers that are provided, maintained, or specified by such other entities.

An action 208 comprises determining whether the device from which the request has been received is a subscriber of the wireless communications carrier or a subscriber of another entity that has provided its own IMS application server or servers.

If the requesting device is a subscriber of the wireless communication carrier, an action 210 is performed of routing the request to an appropriate IMS application server of the wireless communications carrier. For example, the action 210 may comprise parsing the received request to determine which of multiple services are specified by the request, and routing the request to an application server of the carrier that provides the specified service.

If the device is a subscriber of a third-party business entity other than the wireless communications carrier, an action 212 is performed of routing the request to an IMS application server of the business entity. For example, the action 210 may comprise parsing the received request to determine which of multiple services are specified by the request, and routing the request to a corresponding application server that is provided by or on behalf of the entity of which the requesting device is a subscriber. As noted above, in some cases the request may be routed over a wide-area network, such as the Internet, to an application server that is provided and maintained by the third-party entity at its own facilities or at facilities that are controlled by the third-party entity.

In accordance with the example method 200, and in the context of FIG. 1, a first request for a first service may be received from a UE 106 that is a subscriber of the wireless communication carrier 102. This first request will be routed to an appropriate application server 112 that is provided and controlled by the carrier 102. A second request for a second service will be routed to an application server 116 that is provided and maintained by or on behalf of a third-party entity 118, and which is controlled by the third-party entity 118. In some cases, the first and second services may be of the same service type, such as conferencing, and both the carrier 102 and the third-party entity 118 may provide respective application servers corresponding to that service type. For example, a carrier-supported application server 112 may provide a service at a first QoS for subscribers of the carrier, and a third-party-supported application server 116 may provide the service at a second, different QoS for subscribers of the third party.

Figure 3:
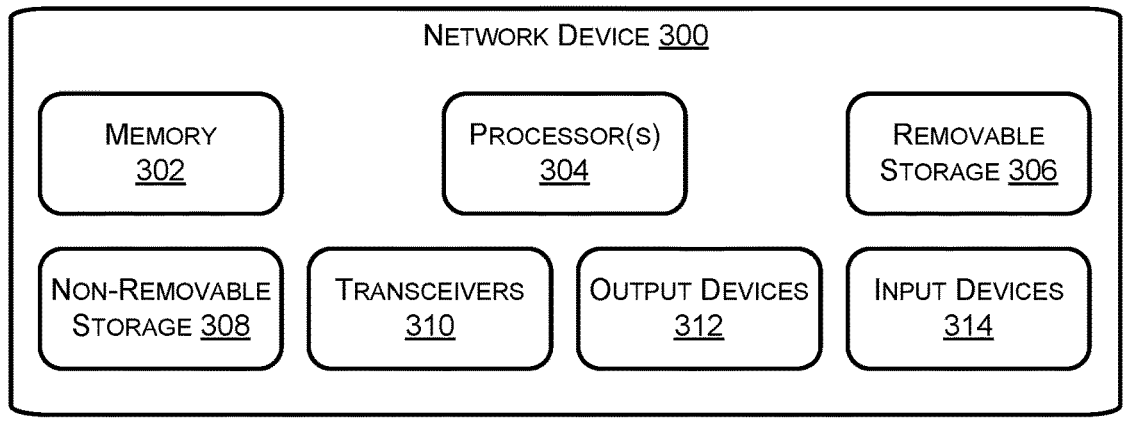
FIG. 3 is a block diagram illustrating relevant high-level components of a server device that may be used to implement various of the components described herein.

FIG. 3 illustrates a component level view of a telecommunication network device 300 capable of implementing components of a telecommunication network, including components shown in FIG. 1 such as the application servers 112 and 116, the CSCF 110, the HSS 114, etc. The network device 300 may, as an example, comprise a physical or virtual computer server.

The network device 300 may have system memory 302 that stores various executable components and data for implementing the method 200 of FIG. 2. The network device 300 may further comprise processor(s) 304, a removable storage 306, a non-removable storage 308, transceivers 310, output device(s) 312, and input device(s) 314, any or all of which can be communicatively connected via a communications bus (not shown).

In various examples, the system memory 302 is volatile (such as RAM), non-volatile (such as ROM, flash memory, etc.) or some combination of the two. In some examples, the processor(s) 304 is a central processing unit (CPU), a graphics processing unit (GPU), or both CPU and GPU, or any other sort of processing unit.

The network device 300 also includes additional data storage devices (removable and/or non-removable) such as, for example, magnetic disks, optical disks, or tape. Such additional storage is illustrated in FIG. 3 by removable storage 306 and non-removable storage 308. The system memory 302, removable storage 306 and non-removable storage 308 are all examples of non-transitory computer-readable storage media.

In some examples, the transceivers 310 include any sort of transceivers known in the art. For example, transceivers 310 may include a radio transceiver that performs the function of transmitting and receiving radio frequency communications. Also, or instead, the transceivers 310 may include other wireless or wired connectors, such as Ethernet connectors or near-field antennas. The transceivers 310 may facilitate connectivity between a public network, such as a packet-switched access network (not shown), and one or more other devices of a telecommunication network.

In some examples, the output devices 312 include any sort of output devices known in the art, such as a display, speakers, a vibrating mechanism, or a tactile feedback mechanism. The output devices 312 also include ports for one or more peripheral devices, such as headphones, peripheral speakers, or a peripheral display.

In various examples, the input devices 314 include any sort of input devices known in the art. For example, the input devices 314 may include a camera, a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although features and/or methodological acts are described above, it is to be understood that the appended claims are not necessarily limited to those features or acts. Rather, the features and acts described above are disclosed as example forms of implementing the claims.

What is claimed is:

1. An IP Multimedia Subsystem (IMS) network system, comprising:
   a first IMS application server associated with a wireless communications carrier to provide a first service for subscribed devices of the wireless communications carrier;
   a second IMS application server operated by a business entity other than the wireless communications carrier to provide a second service for subscribed devices of the business entity, wherein users of the subscribed devices are subscribed to services of the business entity; and
   a service broker configured to perform actions comprising:
      receiving a first service profile and a second service profile used to route a first request and a second request based on a first type of service and a second type of service specified by the first request and the second request, respectively;
      receiving the first request from a first device for the first service, wherein the first device is subscribed to the wireless communication carrier;
      obtaining, from the first request, the first type of service;
      routing the first request to the first IMS application server corresponding to the first type of service based at least in part on the first service profile;
      receiving the second request from a second device for the second service;
      obtaining, from the second request, the second type of service; and
      routing the second request to the second IMS application server corresponding to the second type of service based at least in part on the second service profile.

2. The system of claim 1, wherein the service broker comprises a Call Session Control Function (CSCF) of the wireless communications carrier.

3. The system of claim 1, wherein the first and second service types are a same service type.

4. The system of claim 1, wherein:
   the first and second service types are a same service type; and
   the first and second IMS application servers are configured to provide the first service and the second service at different service levels.

5. The system of claim 1, the actions further comprising:
   obtaining the first service profile corresponding to the first device, the first service profile indicating that requests for the first service are to be routed to the first IMS application server; and
   obtaining the second service profile corresponding to the second device, the second service profile indicating that requests for the second service are to be routed to the second IMS application server.

6. The system of claim 1, wherein:
   the first IMS application server is located at premises of the wireless communications carrier; and
   the second IMS application server is located at a premises of the business entity.

7. The system of claim 1, wherein the business entity comprises a mobile virtual network operator (MVNO).

8. The system of claim 1, wherein each of the first service type and the second service type comprises one or more of:
   instant messaging;
   voice;
   video;
   audio;
   presence;
   streaming;
   charging;
   conferencing;
   location;
   push-to-talk voice;
   RCS; or
   earthquake and tsunami warning; and
   the first request is routed based on the first service type which is different from the second service type used to route the second request.

9. A method comprising:
   receiving, at a computing device associated with an IP Multimedia Subsystem (IMS) of a service provider, a first service profile and a second service profile used to route a first request and a second request based on a first type of service and a second type of service specified by the first request and the second request, respectively;
   receiving from a first communication device, at the computing device associated with the IMS, the first request for a first service, wherein a user of the first communication device is a subscriber of the service provider;

obtaining, from the first request and at the computing device, the first type of service;

routing the first request to a first IMS application server of the service provider, the first IMS application server corresponding to the first type of service based at least in part on the first service profile;

receiving from a second communication device, at the computing device associated with the IMS, the second request for a second service, wherein a user of the second communication device is a subscriber of an entity;

obtaining, from the second request and at the computing device, the second type of service; and routing the second request to a second IMS application server of the entity, the second IMS application server corresponding to the second type of service based at least in part on the second service profile.

10. The method of claim 9, wherein the first and second service types are of a same service type.

11. The method of claim 9, further comprising:
obtaining the first service profile corresponding to the first communication device, the first service profile indicating that requests by the first communication device for the first service are to be routed to the first IMS application server; and obtaining the second service profile corresponding to the second communication device, the second service profile indicating that requests for the second service from the second communication device are to be routed to the second IMS application server.

12. The method of claim 9, further comprising managing the second IMS application server by the service provider on behalf of the entity.

13. The method of claim 9, wherein routing the second request to the second IMS application server comprises communicating with the second IMS application server over a wide-area network.

14. The method of claim 9, wherein:
routing the first request to the first IMS application server is performed by a Call Session Control Function (CSCF) of the service provider; and routing the second request to the second IMS application server is performed by the CSCF of the service provider.

15. A method, comprising:
obtaining, by an IP Multimedia Subsystem (IMS) core of a wireless communications carrier, a service profile used to route a request based on a type of service specified by the request;

receiving, by the IMS core, the request for a service;
obtaining, from the request and by the IMS core, the type of service;

determining that a user of a communication device is a subscriber of a business entity other than the wireless communications carrier for the service; and in response to determining that the user of the communication device is the subscriber of the business entity other than the wireless communications carrier for the service, routing the request to an IMS application server operated by the business entity, the IMS application server corresponding to the type of service based at least in part on the service profile.

16. The method of claim 15, wherein the service profile is obtained from a Home Subscriber Service (HSS) of the wireless communications carrier, and used to determine that the user of the communication device is the subscriber of the business entity other than the wireless communications carrier.

17. The method of claim 15, wherein the request is a first request, the service is a first service, and the IMS application server is a first IMS application server, the method further comprising:
receiving, by the IMS core from the communication device, a second request for a second service;

determining that the user of the communication device is a subscriber of the wireless communications carrier for the second service; and in response to determining that the user of the communication device is the subscriber of the wireless communications carrier for the second service, routing the second request to a second IMS application server.

18. The method of claim 15, wherein:
an IMS server of the wireless communications carrier provides the service with a first quality-of-service (QoS);

the IMS server of the business entity provides the service with a second QoS; and the first QoS is different than the second QoS.

19. The method of claim 15, wherein routing the request to the IMS application server of the business entity comprises communicating with the IMS application server operated by the business entity over a wide-area network.

20. The method of claim 15, wherein:
routing the request to the IMS application server operated by the business entity is performed by a Call Session Control Function (CSCF) of the wireless communications carrier.

* * * * *